(12) United States Patent
Hasegawa et al.

(10) Patent No.: US 7,793,313 B2
(45) Date of Patent: Sep. 7, 2010

(54) OPTICAL DISC DEVICE FOR IDENTIFYING AN INSERTED DISC

(75) Inventors: Kazunori Hasegawa, Kanagawa (JP); Tsukasa Nakayama, Kanagawa (JP); Hiroto Nishida, Ishikawa (JP); Isamu Nakade, Ishikawa (JP); Kenji Urushihara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 605 days.

(21) Appl. No.: 11/814,227

(22) PCT Filed: Jan. 19, 2006

(86) PCT No.: PCT/JP2006/300742

§ 371 (c)(1),
(2), (4) Date: Jul. 18, 2007

(87) PCT Pub. No.: WO2006/077924

PCT Pub. Date: Jul. 27, 2006

(65) Prior Publication Data

US 2009/0204982 A1    Aug. 13, 2009

(30) Foreign Application Priority Data

Jan. 20, 2005   (JP) ............................. 2005-013014

(51) Int. Cl.
*G11B 17/04* (2006.01)
(52) U.S. Cl. ..................................... 720/621
(58) Field of Classification Search ............... 720/621, 720/624, 626
See application file for complete search history.

(56) References Cited

U.S. PATENT DOCUMENTS

| 5,828,641 | A | 10/1998 | Abe et al. |
| 6,574,171 | B1 | 6/2003 | Furukawa et al. |
| 6,728,191 | B1 | 4/2004 | Horita et al. |

(Continued)

FOREIGN PATENT DOCUMENTS

EP              0 457 388 A1     11/1991

(Continued)

OTHER PUBLICATIONS

Supplementary European Search Report for Application No. EP 06 71 1988 dated Jan. 30, 2009.

(Continued)

*Primary Examiner*—Angel A. Castro
(74) *Attorney, Agent, or Firm*—RatnerPrestia

(57) ABSTRACT

To provide an optical disc device in which an identification and a disc ejection control processing for an optical disc with a high transmitting property and an 8-cm optical disc attached to an adapter can be effected easily and positively. There are provided a body capable of receiving an optical disc therein, an insertion/ejection port capable of insertion and ejection of the optical disc relative to the interior of the body, and rollers which are provided within the body, and rotate, while holding the optical disc therebetween, so as to convey the optical disc into the interior of the body. A mechanical detector, having a contact element for contact with at least one of obverse and reverse surfaces of the optical disc to detect the optical disc, is provided within the body so that an identification and a disc ejection control processing for optical discs can be effected easily and positively.

3 Claims, 12 Drawing Sheets

U.S. PATENT DOCUMENTS

| | | | |
|---|---|---|---|
| 6,873,481 B2 * | 3/2005 | Ohyama et al. | 369/30.85 |
| 7,007,285 B2 * | 2/2006 | Suzuki | 720/621 |
| 7,363,636 B2 * | 4/2008 | Suzuki | 720/647 |

FOREIGN PATENT DOCUMENTS

| | | |
|---|---|---|
| EP | 1 001 418 A1 | 5/2000 |
| EP | 1 100 083 A2 | 5/2001 |
| EP | 1 840 894 A1 | 10/2007 |
| GB | 2 141 862 A | 1/1985 |
| JP | 56-114170 A | 9/1981 |
| JP | 2001 312850 A | 11/2001 |
| JP | 2003-248995 A | 9/2003 |

OTHER PUBLICATIONS

International Search Report for PCT/JP2006/300742, dated Feb. 28, 2006.

* cited by examiner

OPTICAL DISC DEVICE FOR IDENTIFYING AN INSERTED DISC

This application is a U.S. National Phase Application of PCT International Application PCT/JP2006/300742.

TECHNICAL FIELD

The present invention relates to an optical disc device capable of identifying a disc inserted into the apparatus.

BACKGROUND ART

As shown in FIGS. 12 and 13, a conventional optical disc device 100 is provided with a base 101, and an optical disc guide member which limits the movement of an inserted optical disc 102 in a widthwise direction (arrow 103a) generally perpendicular to a direction of passing of the optical disc (that is, a loading direction and an ejecting direction) and forms an insertion path is provided at the base 101.

Also, there is provided a roller member 105 which is urged downward (arrow 103b) relative to the inserted optical disc 102 so that the roller member can contact the inserted optical disc 102 and can convey the optical disc 102 by transmitting power thereto so as to effect the loading and ejection of the optical disc 102. Further, there is provided a power source (showing is omitted) which is engaged with a gear 105a provided at the roller member 105 so as to rotate the roller member 105 (see, for example, FIG. 1 and FIG. 2 of JP-A-2003-248995).

In this optical disc device 100, a lever member 106 is provided at the roller member (105)-side relative to the optical disc guide member 104, the lever member having a shaft portion 106a for contacting an outer periphery of the optical disc 102 when the optical disc 102 is inserted.

Further, there are provided a plurality of light-receiving elements 107a, 107b, 107c, 107d and push switches 108a, 108b for detecting displacement of the lever member 106 by contact with a projection 106b provided at the lever member 106.

Incidentally, the push switch 108b is provided at such a position as to detect a maximum displacement of the lever member 106 in a direction of arrow 103c, and can detect the 12-cm optical disc 102. Light-emitting elements (showing is omitted) for emitting detection light are provided in opposed relation respectively to the light-receiving elements 107a, 107b, 107c, 107d, and the detection light is blocked by the optical disc 102 so that the passing optical disc 102 can be detected.

DISCLOSURE OF THE INVENTION

Problem that the Invention is to Solve

However, in the conventional optical disc device 100, by a combination of the mechanical detection unit (employing the lever member 106 which is provided outside the disc conveying path and contacts an end surface of the disc to detect the disc) and the optical detection unit employing the light-receiving elements 107a, 107b, 107c, 107d provided in the disc conveying path, the judgment and an ejection position control for various optical discs including the ordinary 12-cm optical disc, a transparent optical disc, an 8-cm optical disc attached to an adapter, etc., have been effected, and therefore the structure has been complicated, and an operation control for the disc detection has been cumbersome. And besides, in the case of an optical disc with a high light-transmitting property and an 12-cm disc having a recording layer vapor-deposited only on an 8-cm region, the outer shape could not sometimes be accurately detected, and the control of the ejection position has sometime become unstable. Furthermore, in the case of the 8-cm optical disc attached to the adapter, signals equivalent to that of the outer periphery (end surface) of the disc have been frequently detected because of a slit of the adapter or a gap between the adapter and the disc, a complicated processing has been required for identifying whether it is a compatible disc, and also the control of the ejection position has sometimes become unstable.

The present invention has been made in order to solve the conventional problem, and its object is to provide an optical disc device in which an identification and a disc ejection control processing for an optical disc with a high transmitting property and an 8-cm optical disc attached to an adapter can be effected easily and positively.

Means for Solving the Problem

An optical disc device of the present invention includes a body capable of receiving an optical disc therein, an insertion/ejection port for the insertion and ejection of the optical disc relative to an inside of the body, and a mechanical detector which contacts at least one of obverse and reverse surfaces of the optical disc, inserted into the interior of the body from the insertion/ejection port, so as to detect the optical disc.

With this construction, when the insertion of the optical disc is started, a pair of rollers are rotated, and hold the optical disc (inserted into the insertion/ejection port of the optical disc device body) therebetween, and convey the disc into the interior of the body. At this time, a contact element of the detector contacts at least one of the obverse and reverse surfaces of the optical disc, and can detect the outer diameter, shape, inserted condition of the inserted optical disc. The contact element can detect the condition of contact with the optical disc surface, that is, the start of the contacting from the start of the insertion, the continuity of the contacted condition and the finish of the contacting. And besides, the detection is effected only by the detector which is the mechanical detection unit, and therefore a complicated control depending on a combination of a mechanical detection unit and an optical detection unit as in the conventional construction can be eliminated. Furthermore, it does not depend on the optical detection unit, and therefore signals equivalent to that of the outer periphery (end surface) of the disc (which are due to a slit of an adapter or a gap between the adapter and the disc) will not be frequently detected, and the operation control can be made stable.

Furthermore, in the optical disc device of the present invention, the detector includes the contact element which swings about a pivot shaft which is parallel to the obverse and reverse surfaces of the optical disc and also is perpendicular to a direction of inserting and ejecting of the optical disc, a roller which is provided at a distal end of the contact element, and rotates about a shaft extending in the same direction as the pivot shaft, and the detecting unit for detecting a swinging movement of the contact element.

With this construction, the detector can be formed into a simple structure including a small number of parts, that is, the contact element, the roller and the detecting unit, and besides a high operation reliability can be obtained with a small installation space. Furthermore, an inexpensive mechanical sensor can be used as the detection unit. Furthermore, the distal end of the detector contacts the optical disc surface through the roller rolling on this disc surface, and therefore the rubbing and damage relative to the optical disc surface can be eliminated, and besides by reducing a contact friction, a driving load for inserting the disc can be prevented from increasing.

Furthermore, in the optical disc device of the present invention, the detector has an urging unit which urges the distal end of the contact element in such a direction as to bring the distal end into contact with the optical disc.

With this construction, the distal end of the contact element always stably contacts the optical disc surface, and the vibration of the contact element due for example to an external impact or the like is less liable to occur, thereby eliminating an erroneous detection, and the detection accuracy can be enhanced.

Furthermore, in the optical disc device of the present invention, the detector is provided with a maximum offset of 40 mm from a straight line passing through a center of the optical disc in the direction of inserting and ejecting of the optical disc.

With this construction, it can be positively judged whether an 12-cm disc has been inserted into the optical disc device or only an adapter 12A having no 8-cm disc attached thereto has been loaded.

ADVANTAGE OF THE INVENTION

In the present invention, there is provided the mechanical detector having the contact element for contact with at least one of the obverse and reverse surfaces of the optical disc to detect the optical disc, and by doing so, there can be provided the optical disc device having an advantage that an optical disc of a high light-transmitting property having a recording layer partially vapor-deposited thereon, etc., can be easily and positively judged.

Figure 1:
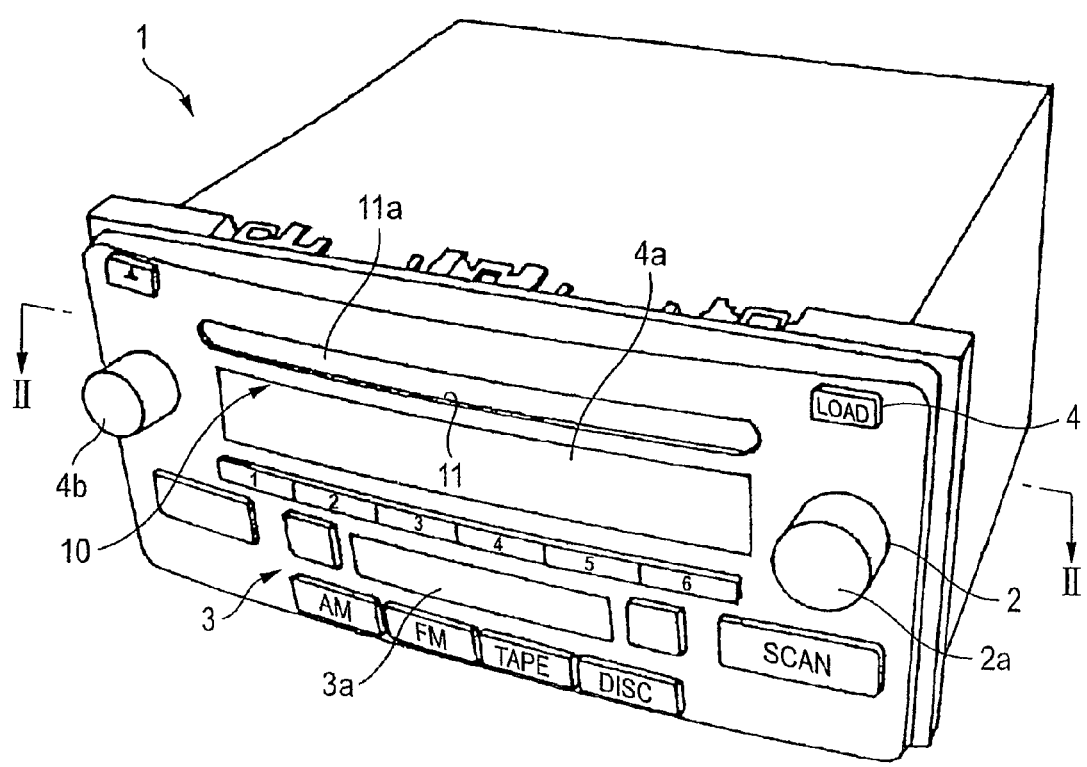
FIG. 1 An overall perspective view showing a car audio apparatus containing an optical disc device according to an embodiment of the present invention.

DESCRIPTION OF THE REFERENCE NUMERALS 10 optical disc device
11 disc insertion/ejection port
12 optical disc
12a upper surface of optical disc (obverse/reverse of optical disc)
13 body
25 detector
26 detection lever (contact)
27 roller
29 detection switch (detection unit)
30 pivot shaft
31 shaft
32 coil spring (urging unit)
34 straight line passing through the center of the disc in an inserting and ejecting direction.
35 straight line passing through the center of the detector in the inserting and ejecting direction.
40 disc outer periphery detection lever

BEST MODE FOR CARRYING OUT THE INVENTION

An embodiment of an optical disc device of the present invention will hereafter be described using the drawings.

The first embodiment of the optical disc device of the present invention is shown in FIG. 1.

FIG. 1 is a perspective view of the whole of a car audio apparatus 1 containing the optical disc device 10 according to the embodiment of the present invention. This car audio apparatus 1 contains a radio 2, a cassette tape reproducing apparatus 3, etc., in addition to the optical disc device 10, and in addition to a display portion 4a and a power/volume dial 4b which are used in common for all functions, a disc insertion/ejection port 11 with an openable/closable lid 11a for the optical disc device 10, and a tuning dial 2a for the radio, a cassette tape insertion port 3a, etc., are provided at a front panel 4. Also, a control portion (not shown) for controlling the radio 2, the cassette tape reproducing apparatus 3, the optical disc device 10, etc., is provided in the interior.

Figure 2:
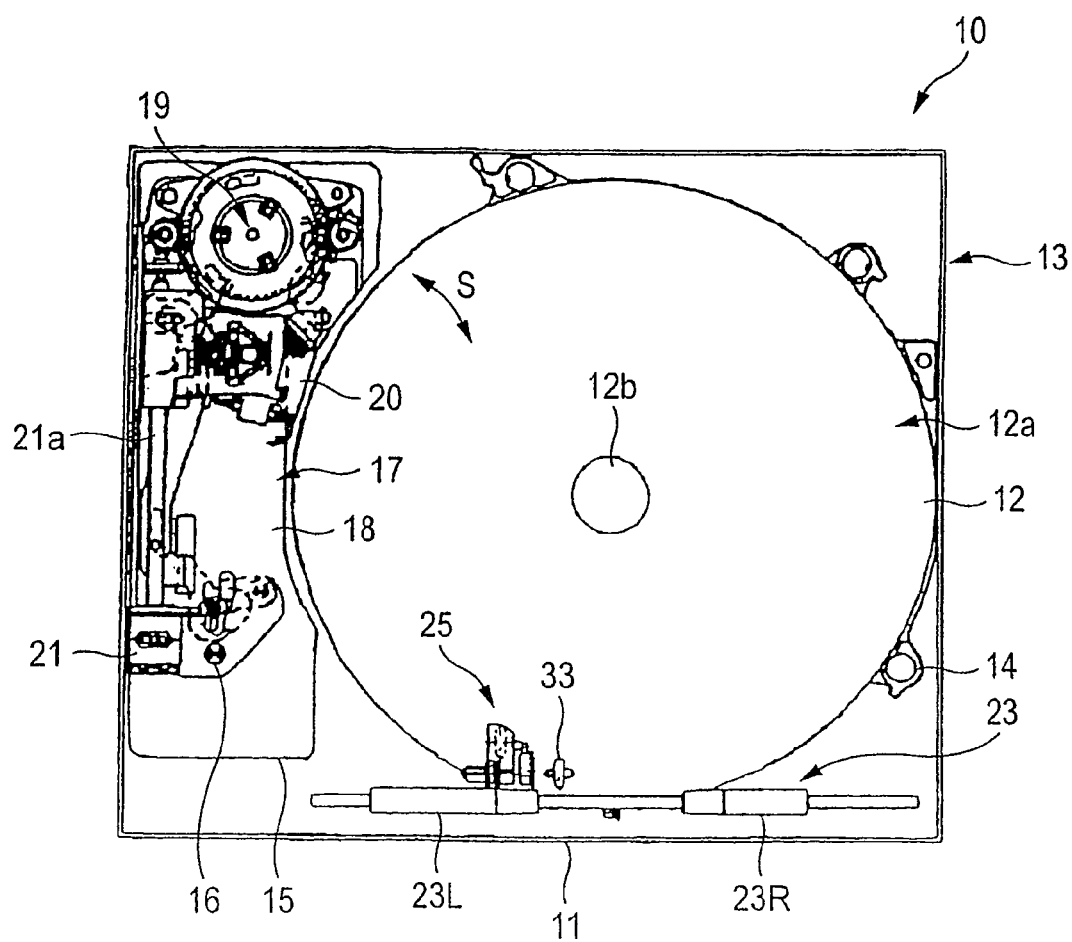
FIG. 2 A plan view of the optical disc device according to the embodiment of the present invention as seen from the position II-II of FIG. 1, showing a standby condition of the optical disc device of the present invention.

FIG. 2 is a cross-sectional view of the optical disc device 10 according to the embodiment of the present invention (contained in the car audio apparatus 1) taken at the position II-II of FIG. 1.

As shown in FIG. 2, the optical disc device 10 includes a rectangular box-shaped body 13, a plurality of trays 14 for storing discs in a stack within the body 13, a tray opening/closing unit which is provided at a base 15 fixed at a predetermined height within the body 13 so as to open and close a region between predetermined trays 14, and a playing portion 17 which is supported so as to be pivotally moved in directions (indicated by arrows S) about a shaft 16 provided at the base 15.

The playing portion 17 has a flat plate-like suspension chassis 18 which pivotally moves about the shaft 16, and this suspension chassis 18 has a clamp mechanism 19 which rotates while holding the disc 12. The suspension chassis 18 further includes a pickup 20 supported for reciprocal movement along the suspension chassis 18 so as to gain access to the rotating disc 12 held by the clamp mechanism 19, and a drive motor 21 and a lead screw 21a for moving this pickup 20.

Figure 3:
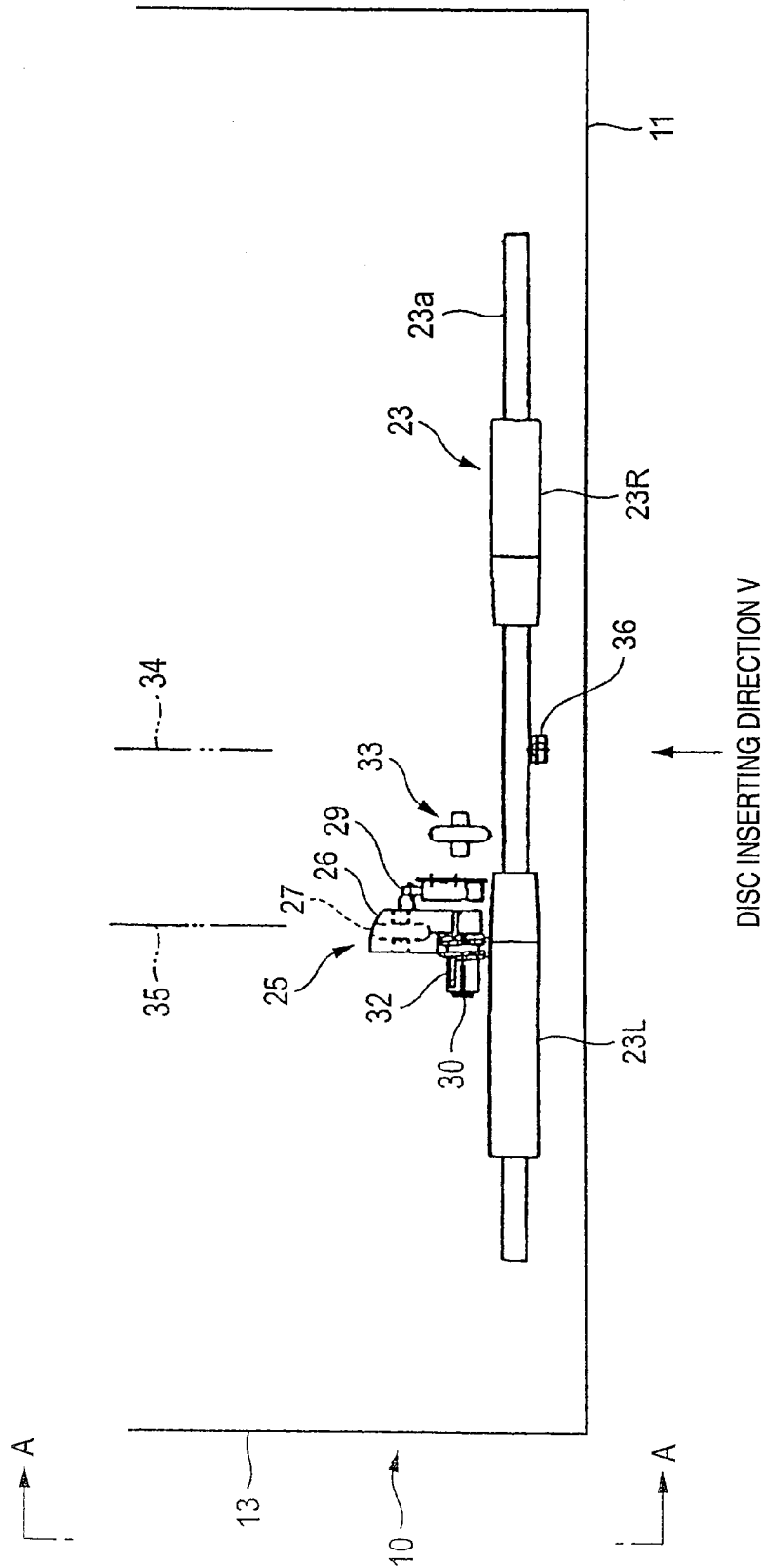
FIG. 3 An enlarged plan view of an important portion of a body of the optical disc device of this embodiment, showing a conveying unit and a detector shown in FIG. 2.

A loading roller 23 and an upper guide roller 24 (which form a conveying unit) which contact the inserted disc, and transmit power thereto to convey the disc 12 so as to effect the insertion (loading) and discharge (ejection) of the disc 12, and a power source (not shown) for rotating the loading roller 23 are provided at those portions of the body 13 disposed near to the disc insertion/ejection port 11. As shown in FIG. 3, the loading roller 23 is divided into left and right loading rollers 23L, 23R mounted on a common shaft 23a. The upper guide roller 24 rotates together with the loading roller 23 when inserting (loading) and discharging (ejecting) the disc 12.

Figure 5:
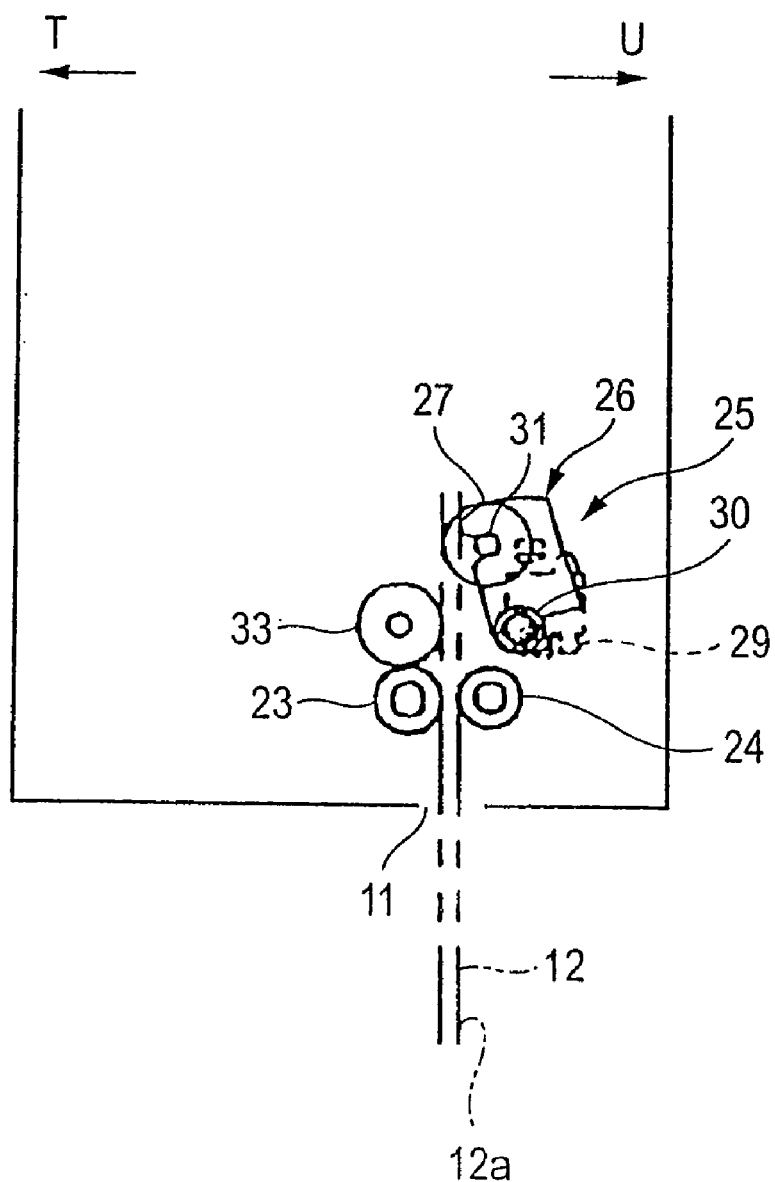
FIG. 5 A view of the optical disc device of this embodiment as seen from the line A-A of FIG. 3.

The loading roller 23 is prevented from moving in an upward-downward direction (a direction U or a direction T in FIG. 5) relative to the body 13. The upper guide roller 24 can move in the upward-downward direction (the direction U or the direction T in FIG. 5) relative to the body 13, and the upper guide roller 24 is urged downward (in the direction T in FIG. 5) relative to the body 13 under the influence of a resilient member (not shown) urging the upper guide roller 24.

Therefore, when the disc 12 is inserted into the body 13, the upper guide roller 24 is moved upward (in the direction U in FIG. 5) relative to the body 13, and the disc 12 is pressed between the loading roller 23 and the upper guide roller 24. The amount in which the upper guide roller 24 can be moved upward (in the direction U in FIG. 5) is more than the amount of movement effected when a plurality of (for example, two) discs are inserted, and the construction is such that even when a plurality of discs are inserted into the apparatus, the loading roller 23 and the upper guide roller 24 can rotatably press the discs so as to effect the loading and ejection.

A mechanical detector 25 is provided at that portion of the body 13 which is disposed near to the disc insertion/ejection port 11 and is disposed inwardly of the loading roller 23 and the upper guide roller 24 in the loading direction. When the disc 12 is inserted into the interior of the disc apparatus, the detector 25 contacts at least one of the obverse and reverse surfaces of the disc 12 to detect the disc 12. In this embodiment, description will be made taking the case where the detector 25 contacts only the upper surface 12a of the disc 12. The detector 25 includes a detection lever 26 serving as a contact element, a roller 27, and a detection switch 29 serving as a detection unit.

The detection lever 26 swings about a pivot shaft 30 which is parallel to the obverse and reverse surfaces of the disc 12 and also is perpendicular to the inserting and ejecting direction (in a disc inserting direction V). The roller 27 is provided at a distal end of the detection lever 26, and rotates about a shaft 31 extending in the same direction as the pivot shaft 30. For example, a mechanical sensor (a limit switch or the like), in which a pressing element is pressed and operated by the swinging movement of the detection lever 26, can be used as the detection switch 29. Thus, the detector 25 contacts the upper surface 12a of the disc 12, and is swung about the pivot shaft 30, and functions to detect the disc 12.

A coil spring 32 serving as an urging unit is fitted on the pivot shaft 30, and the coil spring 32 is fixed at one end to the pivot shaft 30, and is fixed at the other end to the detection lever 26 to urge the distal end of the detection lever 26 in such a direction as to bring this distal end into contact with the disc 12. With this construction, the distal end of the detection lever 26 always stably contacts the upper surface 12a of the disc 12, and the vibration of the detection lever 26 due for example to an external impact or the like is less liable to occur, thereby eliminating an erroneous detection, and the detection accuracy can be enhanced.

Further, a lower guide roller 33 is provided at the opposite side of the disc 12 from the roller 27, and the lower guide roller 33 and the roller 27 (press-contacted with the upper surface 12a of the disc 12 by the coil spring 32) contact the disc 12 at the upper and lower sides thereof or hold the disc therebetween. The lower guide roller 33 is prevented from moving in the upward-downward direction (the direction U or the direction T in FIG. 5), and prevents deformation of the disc 12 due to press-contact by the roller 27.

Namely, the lower guide roller 33 is provided nearer to the insertion/discharge port 11 than the roller 27 is, and before the disc 12 conveyed into the interior of the body 13 from the insertion/discharge port 11 passes the roller 27, a height position of that end of the disc facing in the advancing direction is regulated by the lower guide roller 33, and the height position is fixed. Then, when the disc 12 passes the roller 27, the roller 27 is moved by the thickness of the disc 12, and with this construction, the passage of the disc is detected.

Also, the loading roller 23 and the upper guide roller 24 are provided nearer to the insertion/discharge port 11 than the lower guide roller 33 is, and by doing so, the inserted disc 12, before passing the detector 25, can be kept in a more horizontal condition, and the height position of the disc 12 regulated by the lower guide roller 33 is stabilized, and the detection of the optical disc by the detector 25 is positively effected.

Figure 4:
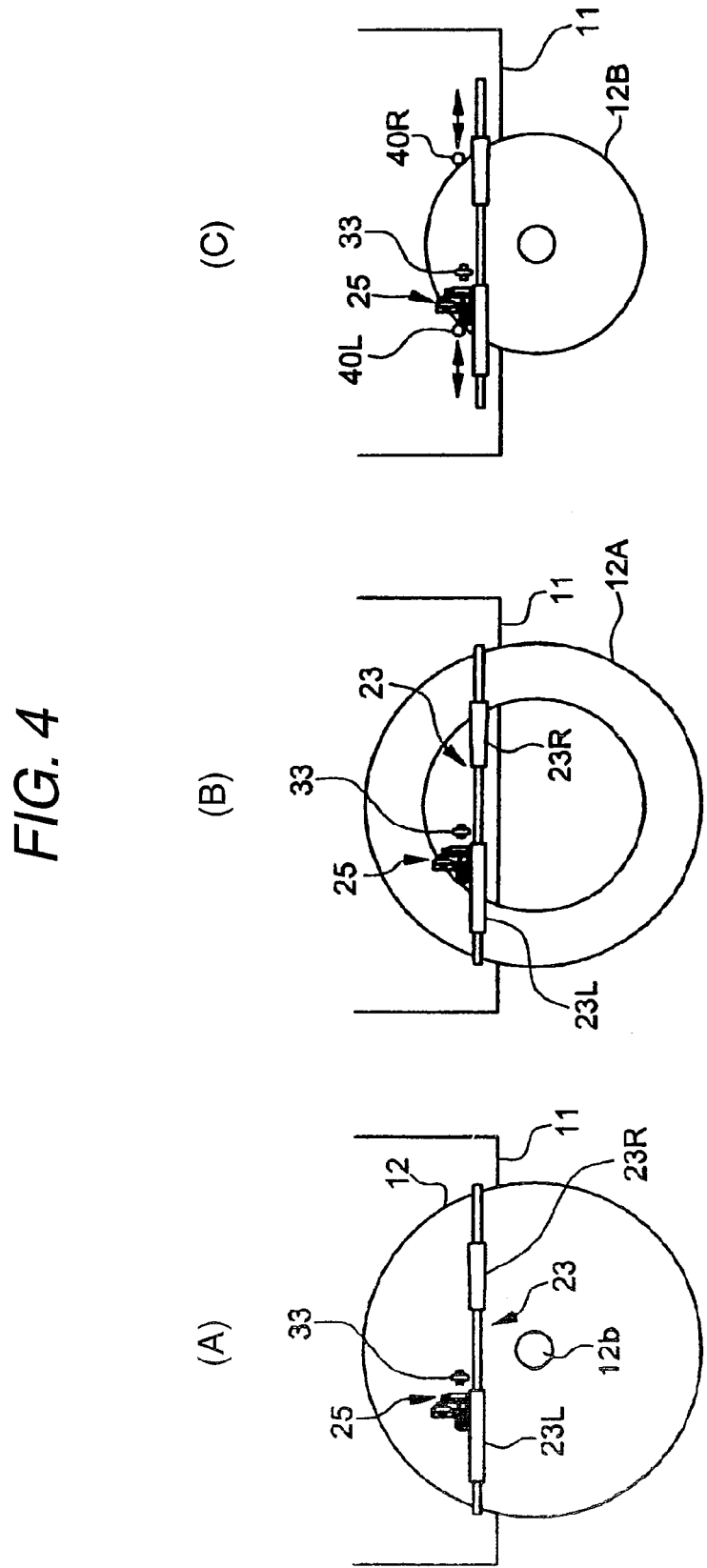
FIG. 4 (A) A view explaining the position of the detector of the optical disc device of this embodiment, using a 12-cm disc. (B) A view explaining the position of the detector of the optical disc device of this embodiment, using an adapter. (C) A view explaining the position of the detector of the optical disc device of this embodiment, using an 8-cm disc.

The detector 25 need to be provided on a locus generated by the inserted disc as shown in FIG. 4(A), and is provided on a locus generated by a hollow portion of an adapter 12A in the process of being inserted as shown in FIG. 4(B). Namely, it provided with a maximum offset of 40 mm from a straight line passing through the center of the disc in the inserting and ejecting direction, and with this arrangement, whether a 12-cm disc has been inserted or only the adapter 12A having no 8-cm disc attached thereto has been inserted can be positively judged by counting a time period during which the detector 25 is held in contact with the disc, etc. Additionally, a disc outer periphery detection lever 40 for detecting the outer periphery of an inserted disc and the detector 25 are used in combination as shown in FIG. 4(C), the insertion of an 8-cm disc of the light-transmitting type can also be more positively detected in the vicinity of the disc insertion/ejection port. In this case, the disc outer periphery detection lever 40 is connected to a slide volume (not shown) or the like, and the lever, when pressed by the outer periphery of the disc in accordance with the insertion/ejection of the disc, can be moved in a direction perpendicularly intersecting the disc inserting and ejecting direction, and this movement is operatively associated with the movement of the slide volume, and therefore how much the disc has been inserted into the body 13 from the insertion/ejection port 11 can be known.

With this construction, the detector 25 can be formed into the simple structure comprising a small number of parts, that is, the detection lever 26, the roller 27 and the detection switch 29, and besides a high operating reliability can be obtained with a small installation space. Furthermore, an inexpensive mechanical sensor can be used as the detection switch 29. Furthermore, the distal end of the detector 25 contacts the upper surface 12a of the disc 12 through the roller 27 rolling on this upper surface, and therefore the rubbing and damage relative to the upper surface 12a of the disc 12 can be eliminated, and besides by reducing a contact friction, a driving load for inserting the disc can be prevented from increasing.

An optical sensor 36 which includes a light-emitting element and a light-receiving element forming, together with the light-emitting element, a pair is provided at that portion of the body 13 disposed in the vicinity of the disc insertion/ejection port 11, and the construction is such that when the disc 12 is inserted into the apparatus, light emitted from the light-emitting element is blocked by the disc 12, and an output of the light-receiving element changes to Hi, so that the insertion of the disc 12 into the apparatus can be detected. The light-receiving element is adapted to output Hi in a light-blocked condition and to output Lo in a light-receiving condition. Incidentally, this optical sensor 36 is provided for the purpose of detecting the insertion of the disc 12, and is different from a construction for identifying the disc 12.

First, the loading operation of the optical disc device 10 for the disc 12 will be described using FIG. 6, FIG. 7, FIG. 8, FIG. 9, FIG. 10 and FIG. 11. Although the optical disc device 10 of this embodiment effects the insertion and ejection of a 12-cm disc so as to effect reproduction or recording, this apparatus can also handle an 8-cm disc. In the case of effecting reproduction or recording relative to an 8-cm disc, an adapter for holding the 8-cm disc on its central portion can be used.

Figure 6:
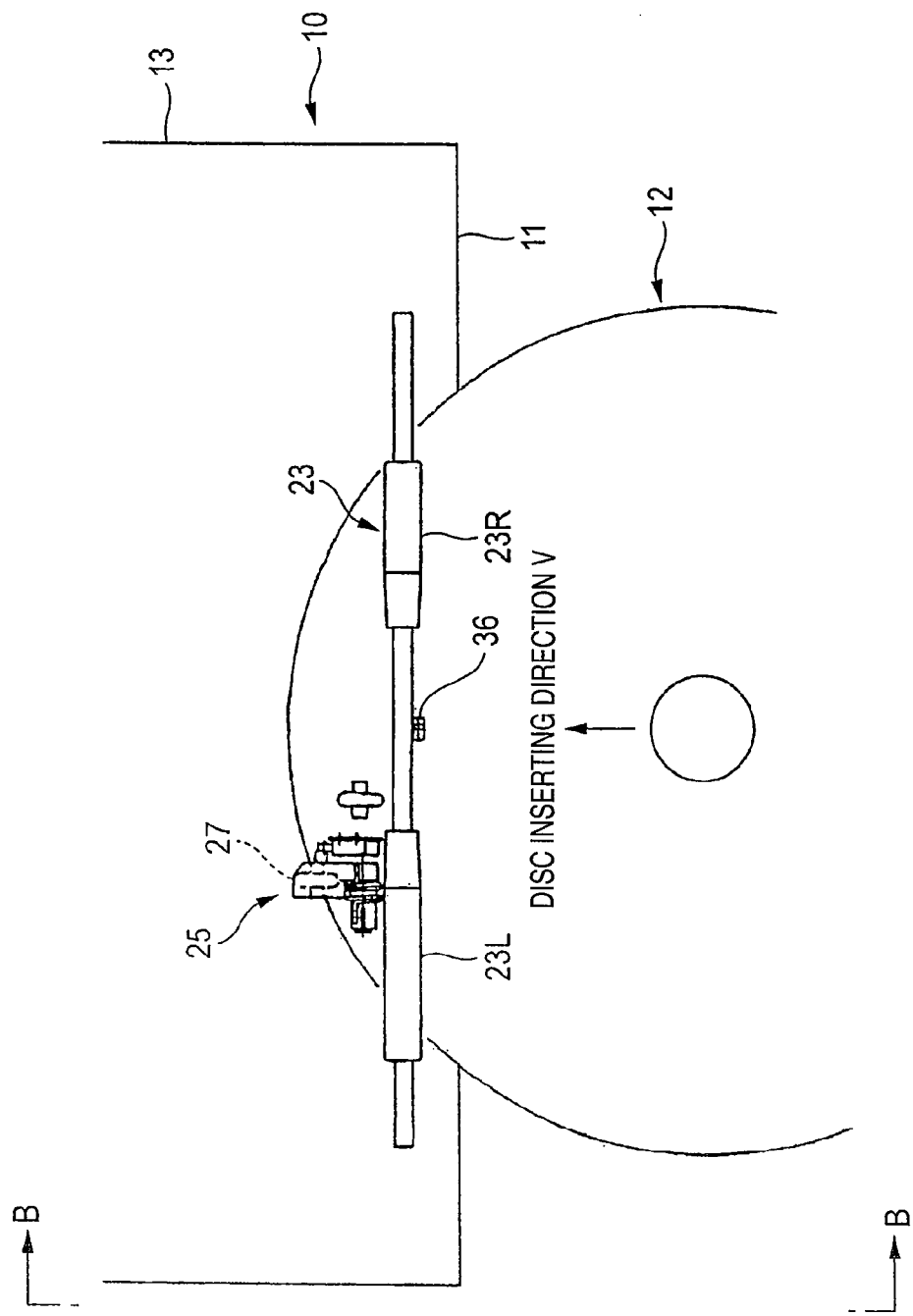
FIG. 6 An enlarged plan view of an important portion of the body of the optical disc device of this embodiment, showing an inserted condition of a 12-cm disc.
Figure 7:
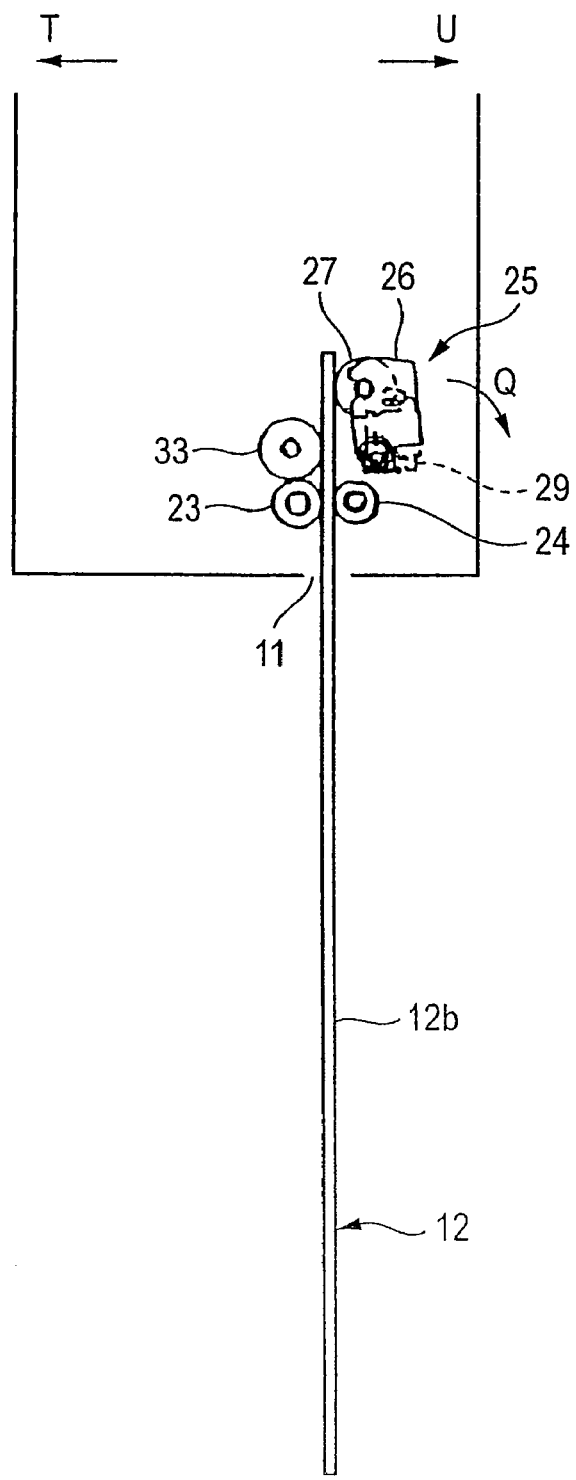
FIG. 7 A view of the optical disc device of this embodiment as seen from the line B-B of FIG. 6.

When the disc 12 is inserted into the interior of the disc insertion/ejection port of the body 13 of the optical disc device 10 by the user as shown in FIG. 6 and FIG. 7, light emitted from the light-emitting element of the optical sensor 36 is blocked by the disc 12, and the output of the light-receiving element of the optical sensor 36 changes to Hi, so that the insertion of the disc 12 into the interior of the disc apparatus is detected, and the optical disc device 10 causes the operation of the power source to be started, thereby starting the rotation of the loading roller 23.

When the disc 12 is further inserted by the user, the disc 12 is pressed between the loading roller 23 and the upper guide roller 24, and the automatic loading of the disc 12 is started. When the automatic loading of the disc 12 is continued, the disc 12 is brought into contact with the roller 27 of the detector 25, and the detection lever 26 is swung in a direction Q (in FIG. 7). As a result, the detection switch 29 is turned on.

When the disc 12 further advances, the pressing of the disc 12 by the loading roller 23 and the upper guide roller 24 is canceled, and the disc 12 is moved in a direction toward a recording/reproducing position. When the disc 12 is moved toward the recording/reproducing position, the engagement between a lever member and a push switch (which are not shown) is canceled, and an output of the push switch changes, and at the timing of this output change, the operation of the drive source (not shown) is stopped, thereby stopping the rotation of the loading roller 23.

When the disc 12 further advances, the contact element between the disc 12 and the roller 27 is canceled, and the detection lever 26 is held in the initial position by the urging force of the coil spring 32. And, the detection switch 29 is turned off.

Then, the disc 12 is conveyed to the position of recording/reproduction (by a disc recording/reproduction portion) by a mechanism (not shown). Then, the suspension chassis 18 is pivotally moved about the shaft 16 in the direction of arrow S from the standby position (shown in FIG. 2) to the reproducing position. By doing so, the suspension chassis 18 is inserted between predetermined trays 14. Further, the disc 12 is held by the clamp mechanism 19. Information recorded on the disc 12 is reproduced while rotating the disc 12 and also moving the pickup 20 along the suspension chassis 18.

Figure 8:
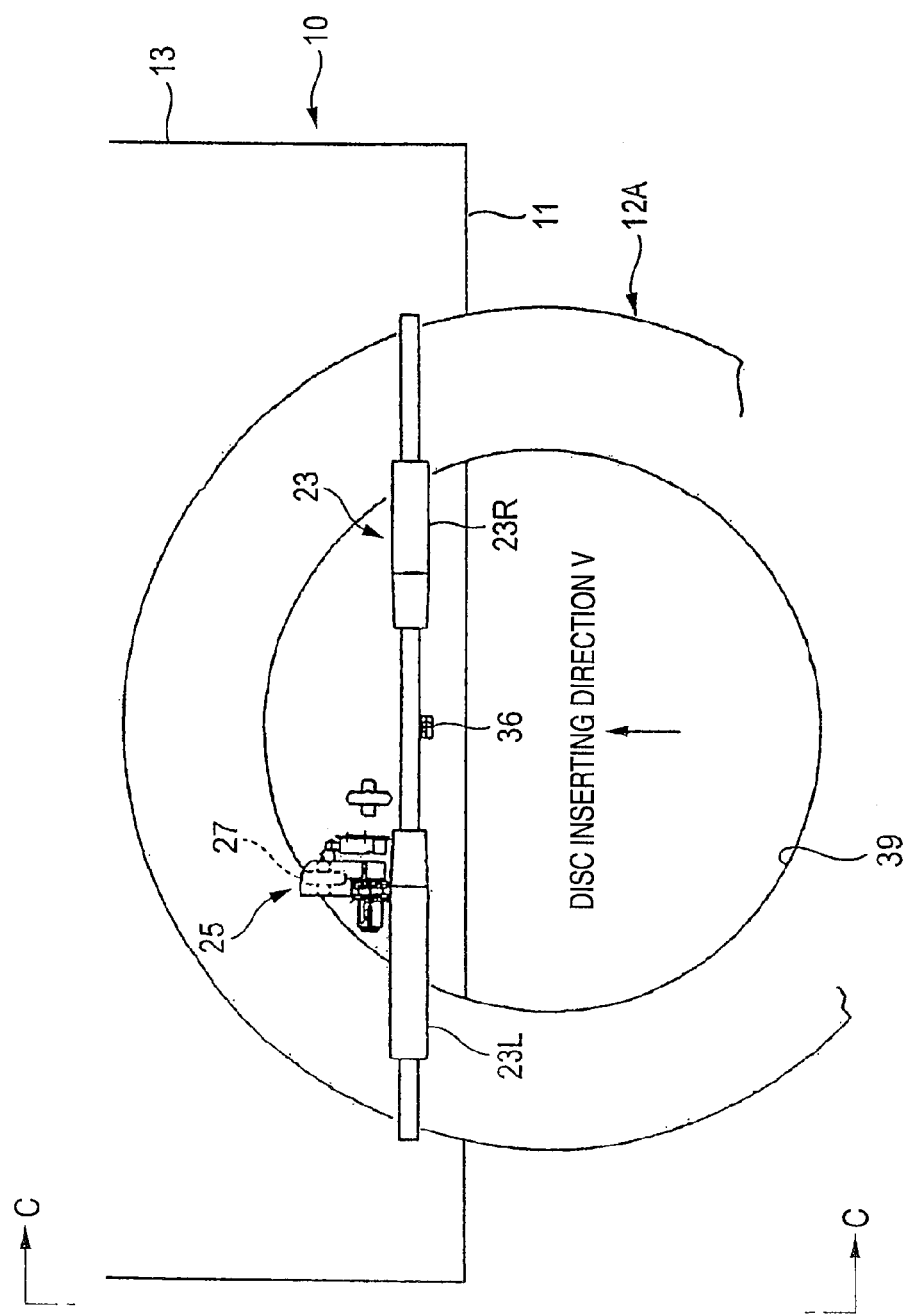
FIG. 8 An enlarged plan view of an important portion of the body of the optical disc device of this embodiment, showing an inserted condition of an empty 8-cm disc adapter.
Figure 9:
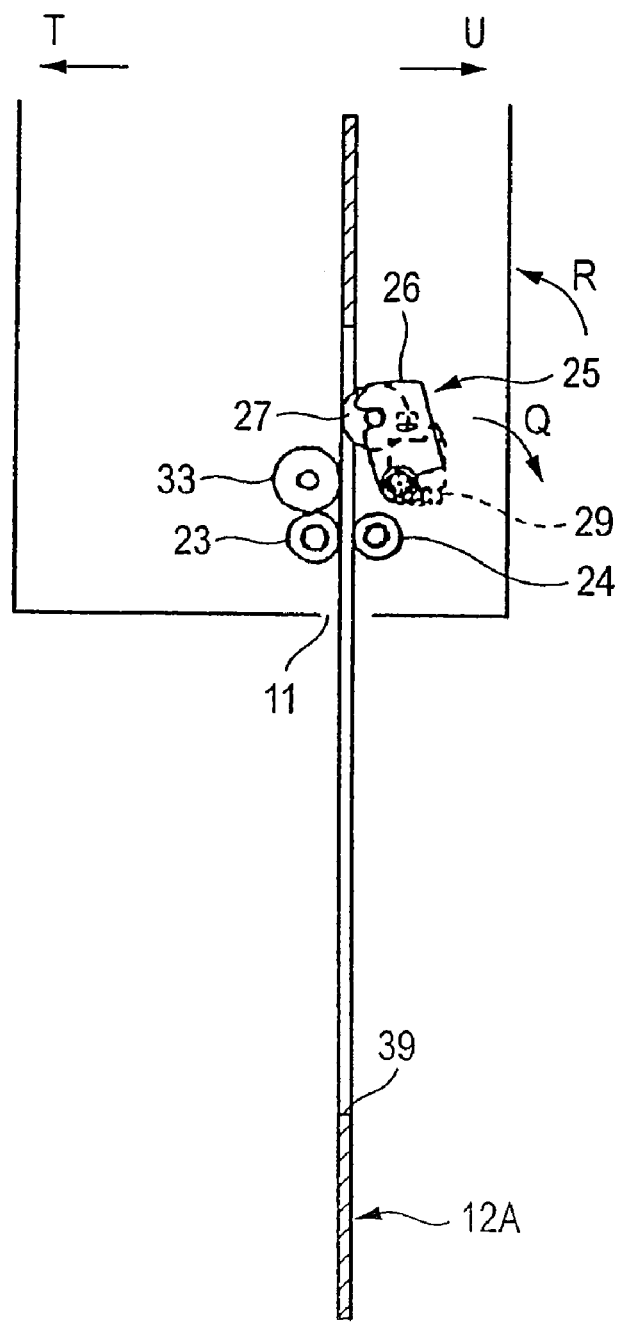
FIG. 9 A view of the optical disc device of this embodiment as seen from the line C-C of FIG. 8.
Figure 10:
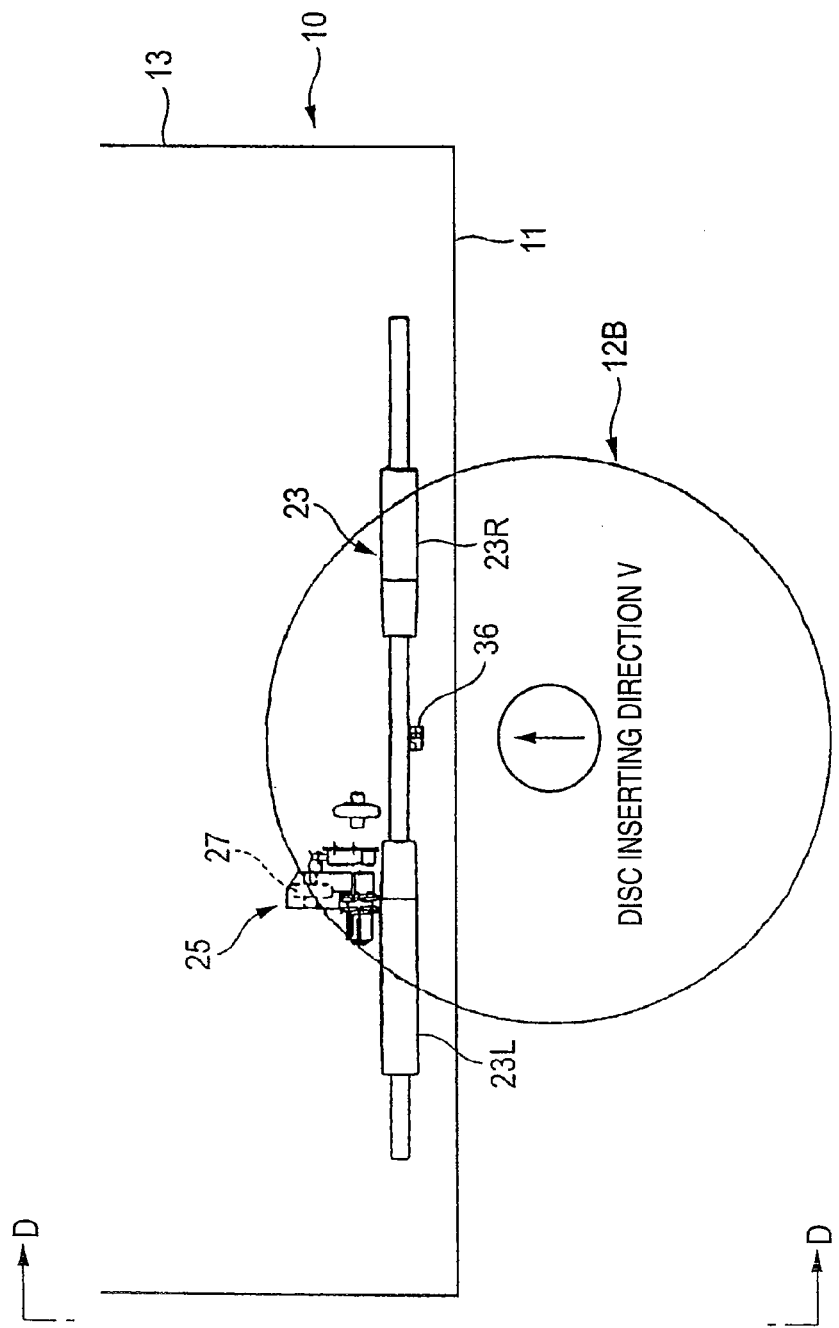
FIG. 10 An enlarged plan view of an important portion of the body of the optical disc device of this embodiment, showing an inserted condition of an 8-cm disc.
Figure 11:
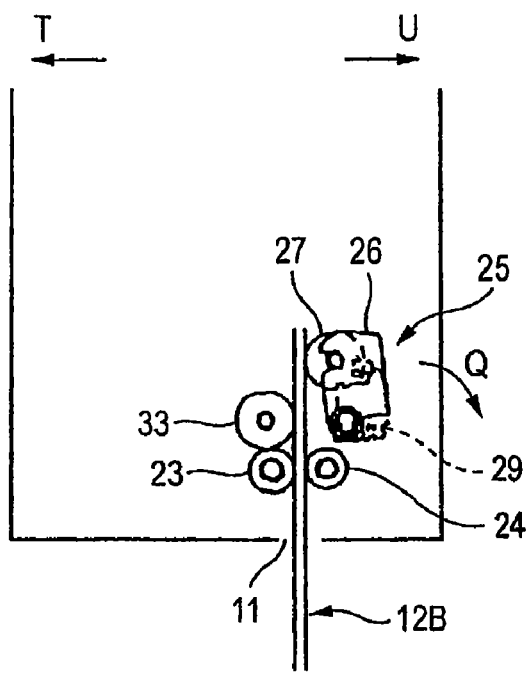
FIG. 11 A view of the optical disc device of this embodiment as seen from the line D-D of FIG. 10.
Figure 12:
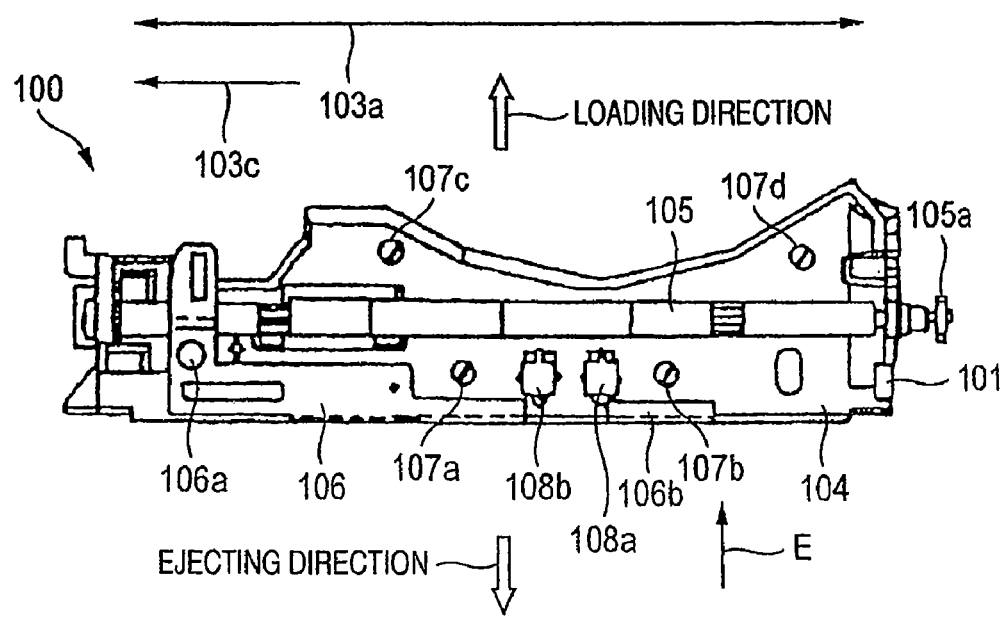
FIG. 12 A plan view of an important portion of a conventional optical disc device.
Figure 13:
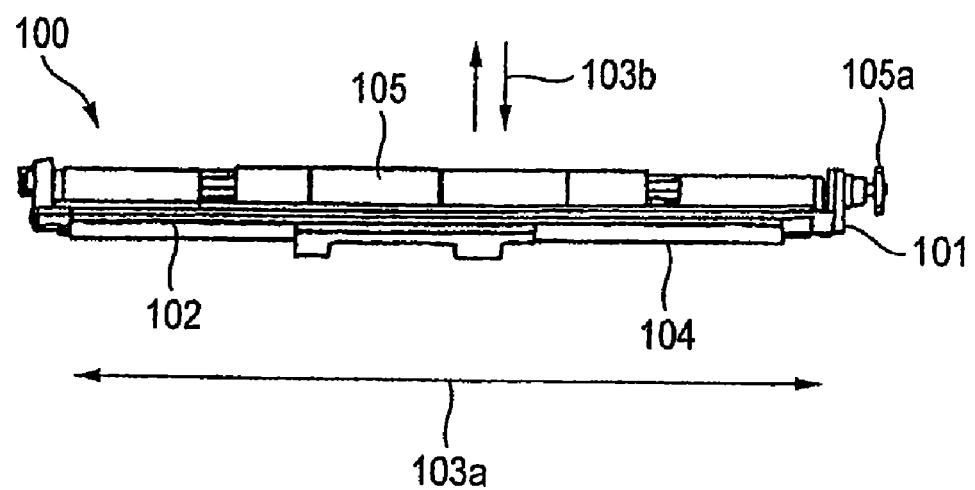
FIG. 13 A front-elevational view as seen from a direction E of FIG. 12.

Here, the adapter 12A for enabling an 8-cm disc 12B (see FIG. 10) to be handled similarly with the 12-cm disc 12 is shown in FIG. 8 and FIG. 9. The adapter 12A has a round shape having an outer diameter substantially equal to that of the 12-cm disc 12, and a disc fitting hole 39 of a round shape (which is slightly larger than the outer diameter of the 8-cm disc 12B) for the fitting of the 8-cm disc 12B thereto is formed through a central portion thereof. Disc holding claws (not shown) (which are convex portions) for attaching the 8-cm disc 12B to the adapter 12A are formed on an inner peripheral surface of the disc fitting hole 39, and extend alternately from obverse and reverse surfaces (opposite sides).

Therefore, for example, in case the empty adapter 12A having no 8-cm disc 12B attached thereto is inserted, first, light emitted from the light-emitting element of the optical sensor 36 is blocked by the adapter 12A when the adapter 12A is inserted into the interior of the disc insertion/ejection port 11 of the body 13, and the output of the light-receiving element of the optical sensor 36 changes to Hi, so that the insertion of the adaptor 12A into the disc apparatus is detected, and the optical disc device 10 causes the operation of the power source to be started, thereby staring the rotation of the loading roller 23.

When the adapter 12A is further inserted by the user, the adapter 12A is pressed between the loading roller 23 and the upper guide roller 24, and the automatic loading of the adapter 12A is started. When the automatic loading of the adapter 12A is continued, the adapter 12A is brought into contact with the roller 27 of the detector 25, and the detection lever 26 is swung in the direction Q (in FIG. 9). However, in the case of the adapter 12A having no 8-cm disc 12B attached thereto, the roller 27 drops into the disc fitting hole 39, and the detection lever 26 is swung in a direction R (in FIG. 9). As a result, the output level of the detection switch 29 returns to the initial position, and the adaptor 12A having no 8-cm disc attached thereto is detected.

When a disc 12B is further inserted by the user, the disc 12B is pressed between the loading roller 23 and the upper guide roller 24, and the automatic loading of the disc 12B is started. When the automatic loading of the disc 12B is continued, the disc 12B is brought into contact with the roller 27 of the detector 25, and the detection lever 26 is swung in the direction Q (in FIG. 11). As a result, the detection switch 29 is turned on. At this time, with respect to a time period from the detection of the insertion of the disc by the optical sensor 36 to the turning-on of the detection switch 29, the 12-cm disc 12 and the 8-cm disc 12B have different values since the disc diameters are different. Therefore, the 12-cm disc 12 and the 8-cm disc 12B can be detected.

Next, the ejecting operation of the optical disc device 10 for the disc 12 will be described. When the reproduction of the information recorded on the disc 12 is finished, the pickup 20 is moved to the standby position along the suspension chassis 18. Then, the holding of the disc 12 by the clamp mechanism 19 is canceled, the suspension chassis 18 is moved from the reproducing position to the standby position. Then, the disc 12 is carried out from the recording/reproducing position.

When the disc 12 is carried out from the recording/reproducing position, the lever member (not shown) is pivotally moved, and the lever member is brought into contact with the push switch, so that the output of the push switch changes from Hi to Lo. At the timing of change of the push switch output to Hi, the operation of the drive source (not shown) is started, thereby starting the rotation of the loading roller 23.

When the disc 12 is further conveyed by the mechanism (not shown), the disc 12 is brought into contact with the loading roller 23, and is pressed between the loading roller 23 and the upper guide roller 24, so that the disc conveyance of the disc 12 by the loading roller 23 is started.

The disc 12 advances in the ejecting direction at a timing reverse to that in the loading operation, and the disc is conveyed to an ejection completion position. Incidentally, detection of the completion of the ejection of the disc 12 is effected by the detector 25 and the optical sensor 36. With this operation, the ejecting operation for the disc 12 is completed.

Thus, in the above optical disc device 10, when the insertion of the disc 12 is started, the insertion of the disc 12 is detected by the optical sensor 36, and in accordance with this detection, the pair of loading roller 23 and upper guide roller 24 are rotated, and hold the disc 12 (inserted in the disc insertion/ejection port 11 of the body 13) therebetween, and convey the disc into the interior of the body 13. At this time, the detection lever 26 of the detector 25 contacts the upper surface 12a of the disc 12, and the outer diameter, shape and inserted condition of the inserted disc 12 are detected. The detection lever 26 can detect the condition of contact with the upper surface 12a of the disc 12, that is, the start of the contacting from the start of the insertion, the continuity of the contacted condition, and the finish of the contacting.

And besides, in this optical disc device 10, the detection is effected only by the detector 25 which is the mechanical detection unit, and therefore a complicated control depending on a combination of a mechanical detection unit and an optical detection unit as in the conventional construction can be eliminated. Furthermore, it does not depend on the optical detection unit, and therefore signals equivalent to that of the outer periphery (end surface) of the disc (which are due to a slit of the adapter 12A or a gap between the adapter 12A and the 8-cm disc 12B) will not be frequently detected, and the operation control can be made stable.

Incidentally, in this embodiment, the roller 27 is located at the upper side of the disc 12 to be inserted, and is so provided as to be moved upward and downward, and the lower guide roller 33 is located at the lower side of the disc 12 to be inserted, and is fixed in the upward-downward direction. However, the disc 12 can be detected even in the case where the roller 27 is located at the lower side of the disc 12 to be inserted, and is so provided as to be moved upward and downward, and the lower guide roller 33 is located at the upper side of the disc 12 to be inserted, and is fixed in the upward-downward direction.

In this embodiment of the optical disc device 10 of the present invention, the mechanical detector 25, having the detection lever 26 for contact with the upper surface 12a of the disc 12 to detect the disc 12, is provided within the body 13, and by doing so, there can be provided the optical disc device 10 having an advantage that the judgment and disc ejection control processing for the optical disc of a high light-transmitting property having a recording layer partially vapor-deposited thereon and the disc attached to the adapter 12A can be easily and positively effected.

Although the embodiment of the present invention has been described above, the present invention is not limited to the matters shown in the above embodiment, and in the present invention, it is well expected that those skilled in the art may change/apply the embodiment on the basis of the description of the specification and well known techniques, and these will fall within the scope to be protected.

The present Application is based on Japanese Patent Application (Patent Application No. 2005-013014) filed on Jan. 20, 2005, and contents thereof are incorporated herein as a reference.

INDUSTRIAL APPLICABILITY

As described above, the optical disc device of the present invention is the optical disc device including the body capable of receiving the optical disc therein, the insertion/ejection port for the insertion and ejection of the disc relative to the interior of the body, and the rollers which are provided within the body, and rotate, while holding the optical disc therebetween, so as to convey the optical disc into the interior of the body, and by providing the mechanical detector within the body which detector has the contact element for contact with at least one of the obverse and reverse surfaces of the optical disc to detect the optical disc, there is obtained an advantage that the judgment and disc ejection control processing for the optical disc with a high light-transmitting property and the disc attached to the adapter can be easily and positively effected, and this is useful as a disc apparatus and the like.

The invention claimed is:

1. An optical disc device, comprising:
   a body capable of receiving an optical disc therein;
   an insertion/ejection port which inserts and ejects the optical disc relative to an inside of the body;
   a lower guide roller which regulates a height position of the optical disc inserted into the inside of the body; and
   a mechanical detector which is provided at the opposite side of the optical disc inserted into the interior of the body from the lower guide roller, and contacts at least one of obverse and reverse surfaces of the optical disc so as to detect the optical disc,
   wherein the mechanical detector is provided with an offset of maximum 40 mm from a straight line passing through a center of the optical disc in the direction of inserting and ejecting of the optical disc, and the offset from the straight line is greater than a radius of a center hole of the optical disc inserted in the inside of the body.

2. The optical disc device recited in claim 1, wherein the mechanical detector includes:
   a contact element which swings about a pivot shaft which is parallel to the obverse and reverse surfaces of the optical disc and is perpendicular to a direction of inserting and ejecting of the optical disc;
   a roller which is provided at a distal end of the contact element, and rotates about a shaft extending in the same direction as the pivot shaft; and
   a detecting unit which detects a swinging movement of the contact element.

3. The optical disc device recited in claim 2, wherein the mechanical detector has an urging unit which urges a distal end of the contact element in a direction of bringing the distal end into contact with the optical disc.

* * * * *